United States Patent [19]

Lutterbach et al.

[11] Patent Number: 5,510,828

[45] Date of Patent: Apr. 23, 1996

[54] INTERACTIVE VIDEO DISPLAY SYSTEM

[76] Inventors: R. Steven Lutterbach; Frederick Smith; Peter J. Zapf, all of c/o The Leap Partnership, 22 W. Hubbard, Chicago, Ill. 60610

[21] Appl. No.: 203,788

[22] Filed: Mar. 1, 1994

[51] Int. Cl.$^6$ ............................................. H04N 7/173
[52] U.S. Cl. ........................ 348/13; 348/564; 348/739; 345/1; 340/901
[58] Field of Search .................... 348/13, 564, 563, 348/739, 744; 340/825.44, 825.69, 825.72, 825.17, 904, 905, 901; 345/1; 455/18, 66, 11.1, 54.1, 56.1, 6.3; 434/307 R; 273/433; H04N 5/44, 5/445, 5/74, 9/31, 7/173

[56] References Cited

U.S. PATENT DOCUMENTS

| | | | |
|---|---|---|---|
| 2,979,607 | 4/1961 | Herzfeld | 455/6.3 |
| 3,023,308 | 2/1962 | Herzfeld | |
| 3,131,351 | 4/1964 | Herzfeld et al. | 455/6.3 |
| 4,027,248 | 5/1977 | Muzyka | 455/6.3 |
| 4,047,109 | 9/1977 | Sekiguchi | 455/6.3 |
| 4,368,485 | 1/1983 | Midland | 358/64 |
| 4,771,344 | 9/1988 | Fallacaro et al. | 358/335 |
| 4,845,751 | 7/1989 | Schwab | 381/25 |
| 5,003,293 | 3/1991 | Wu | 340/573 |
| 5,061,921 | 10/1991 | Lesko et al. | 340/825.44 |
| 5,132,666 | 7/1992 | Fahs | 340/468 |
| 5,133,081 | 7/1992 | Mayo | 455/18 |
| 5,214,793 | 5/1993 | Conway et al. | 455/49.1 |
| 5,218,629 | 6/1993 | Dumond Jr et al. | 340/904 |
| 5,253,066 | 10/1993 | Vogel | 348/734 |
| 5,254,908 | 10/1993 | Alt et al. | 340/825.49 |
| 5,257,017 | 10/1993 | Jones et al. | 345/13 |
| 5,309,174 | 5/1994 | Minkus | 340/825.44 |

FOREIGN PATENT DOCUMENTS

| | | | |
|---|---|---|---|
| 0349470 | 1/1990 | European Pat. Off. | G08G 1/09 |
| 227195 | 9/1988 | Japan | 358/194.1 |

OTHER PUBLICATIONS

Dak Summer Catalog "Wireless TV Marriage Saver" Feb. 1991.

Sony JumboTron promotional packet, © 1990 Sony Corporation of America.

Nuts Connect 918, Desktop Video Conferencing System, promotional flier, © 1993 NUTS Technologies Limited.

Primary Examiner—James J. Groody
Assistant Examiner—Chris Grant
Attorney, Agent, or Firm—Wood, Phillips, VanSanten, Clark & Mortimer

[57] ABSTRACT

An interactive video display system is disclosed for communicating with local viewers. The system includes a receiver for receiving a modulated signal carrying related audio and video information. A video and audio control is operatively connected to the receiver for receiving the modulated signal and separating the signal into a video signal and an audio signal. A video display monitor is connected to the control for receiving the video signal and displaying the video information carried by the video signal. A radio transmitter is connected to the control for receiving the audio signal and transmitting a radio frequency signal at a select frequency so that the audio information related to the video information can be received by viewers proximate the video display system. An interactive control is operatively associated with the video and audio control for generating instructions to be displayed, the video and audio control combining the received instructions with the received video information prior to transferring the video signal to the video display monitor.

23 Claims, 6 Drawing Sheets

INTERACTIVE VIDEO DISPLAY SYSTEM

FIELD OF THE INVENTION

This invention relates to a display system and, more particularly, to a display system comprising a large screen video display system having interactive capabilities.

BACKGROUND OF THE INVENTION

Advertisers continue to strive to improve presentation of products to potential customers. Various media are typically used depending on the desired audience.

One common form of advertisement is a roadside billboard. The typical billboard consists of a large board mounted at an elevated position alongside the road. A large print ad is adhered to the billboard. Such ads can be effective as drivers are a captive audience while passing the billboard. Often the billboard stands out simply due to its large size. One problem with such a billboard is that advertisements remain static. Changing the displayed ad can be time consuming and expensive, being a labor intensive procedure. Also, with such a billboard there is a limited amount of information that can be conveyed to the relevant public. This is due to the fact that the billboard is visible for only a short period of time. Moreover, feedback regarding effectiveness of the billboard is unavailable.

In addition to the advertisement itself being static, the location of the billboard remains unchanged. The exact location of the billboard can impact on its success. Different locations may be appropriate at different times of the day, different days of the week or the like. To satisfy such requirements, an advertisement must place numerous ads on a plurality of appropriately situated billboards, increasing advertising costs.

All of the above problems may not exist with respect to other forms of advertising, or programming, such as on television. However, with any form of advertisement direct customer feedback is desirable. Advantageously, a viewer could "talk back" to a program being viewed.

The present invention is directed to overcoming one or more of the problems discussed above in a novel and simple manner.

SUMMARY OF THE INVENTION

In accordance with the invention there is provided a dynamic interactive video display system.

Broadly, there is disclosed herein an interactive video display system for communicating with local users. The system includes means for receiving a modulated signal carrying related audio and video information. A video and audio control is operatively connected to the receiving means for receiving the modulated signal and separating the signal into a video signal and an audio signal. A video display is connected to the control for receiving the video signal and displaying the video information carried by the video signal. A radio transmitter is connected to the control for receiving the audio signal and transmitting a radio frequency signal at a select frequency so that the audio information related to the video information can be received by users proximate the video display system. An interactive control is operatively associated with the video and audio control for generating instructions to be displayed, the video and audio control combining the received instructions with the received video information prior to transferring the video signal to the display.

It is a feature of the invention that the receiving means comprises a television receiver.

It is another feature of the invention that the receiving means comprises a video tape playing device.

It is a further feature of the invention providing an enclosure supporting the video display and housing the receiving means, the controls and the radio transmitter.

It is an additional feature of the invention to provide a stationary post supporting the enclosure at an elevated position.

It is still another feature of the invention to provide a mobile vehicle and a lift supporting the enclosure on the vehicle.

It is still another feature of the invention to provide an audio sound system operatively associated with the display and connected to the video and audio control for receiving the audio signal and generating audio sounds in response thereto.

It is still another feature of the invention to provide a local receiver operatively associated with the operator control for receiving user responses from a user input device proximate the system.

It is yet another feature of the invention that the interactive control comprises an interactive marketing system including means for generating a series of statements to be displayed on the display and means for receiving and storing responses to the statements received from the local receiver.

It is still a further feature of the invention to provide a video camera mounted proximate the display system and connected to the video and audio control for developing a video camera signal representing images proximate the display system.

It is still another feature of the invention to provide a television transmitter connected to the video and audio control for transmitting a signal including video information from the camera.

It is still yet a further feature of the invention that the video and audio control includes means for displaying images from the video camera with received video information on the display system.

DETAIL DESCRIPTION OF THE INVENTION

In accordance with the invention an interactive video display system is provided which, in addition to providing dynamic programming, provides numerous options in presenting programming to viewers as well as providing feedback regarding the programming.

Figure 1:
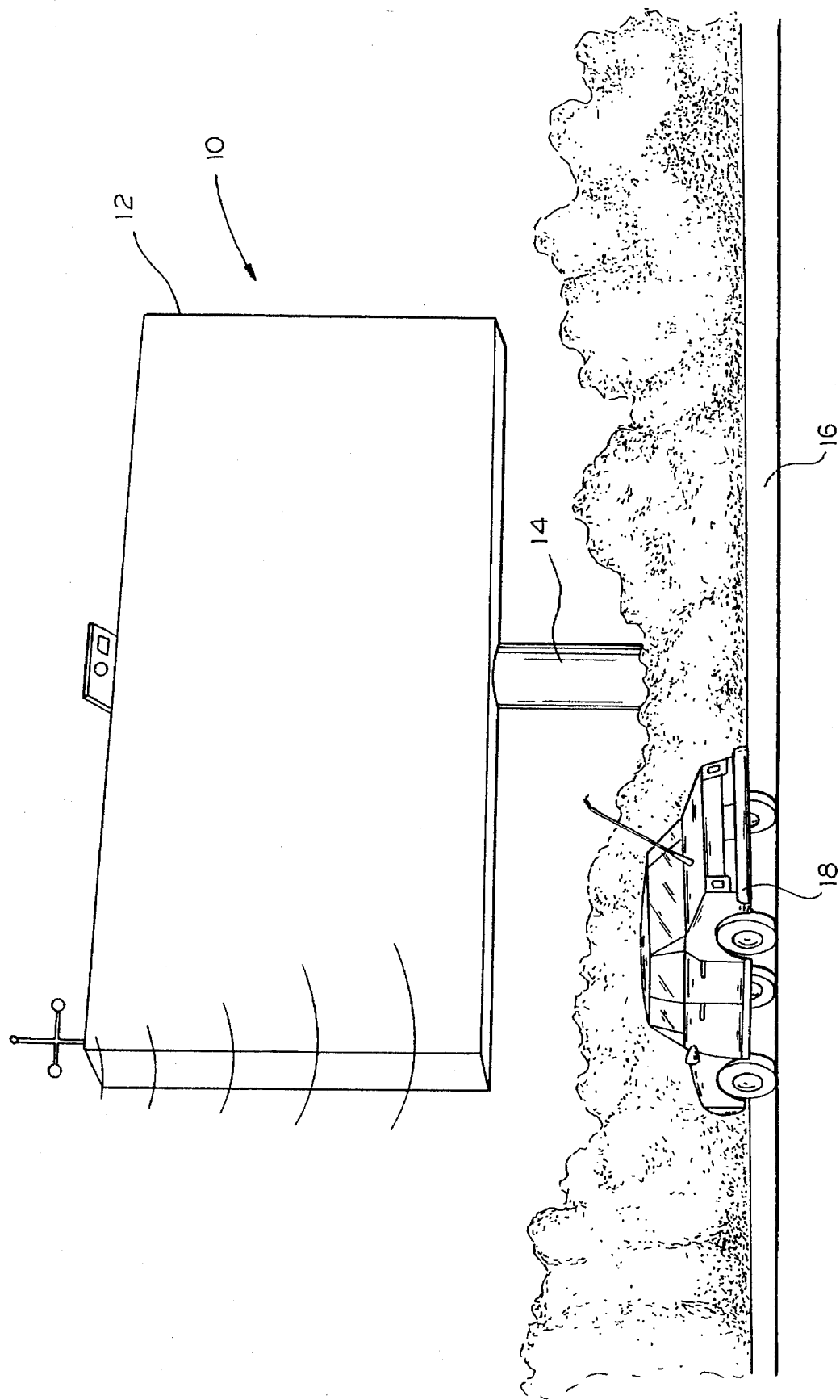
FIGS. 1–4 comprise perspective views illustrating plural applications for the interactive billboard system according to the invention.

With reference to FIG. 1, there is illustrated a conventional application for an interactive video display system 10 according to the invention. The common form of a billboard consists of a roadside board mounted at an elevated position along the side of a road. Such a billboard is viewable to drivers passing by. In the illustrated embodiment of the invention, the interactive video display system 10 includes a video billboard 12 mounted atop a stationary post 14 proximate a road 16. As such, the billboard 12 is viewable by persons passing by in cars 18. Beyond displaying information to passersby, the display system 10 communicates audio information to be heard on a car radio or with a local sound system. Likewise, the display system 10 is operable to receive feedback from the user either in the form of responses to statements presented on the billboard 12 or via image information. All of these features are described more particularly below.

Figure 2:
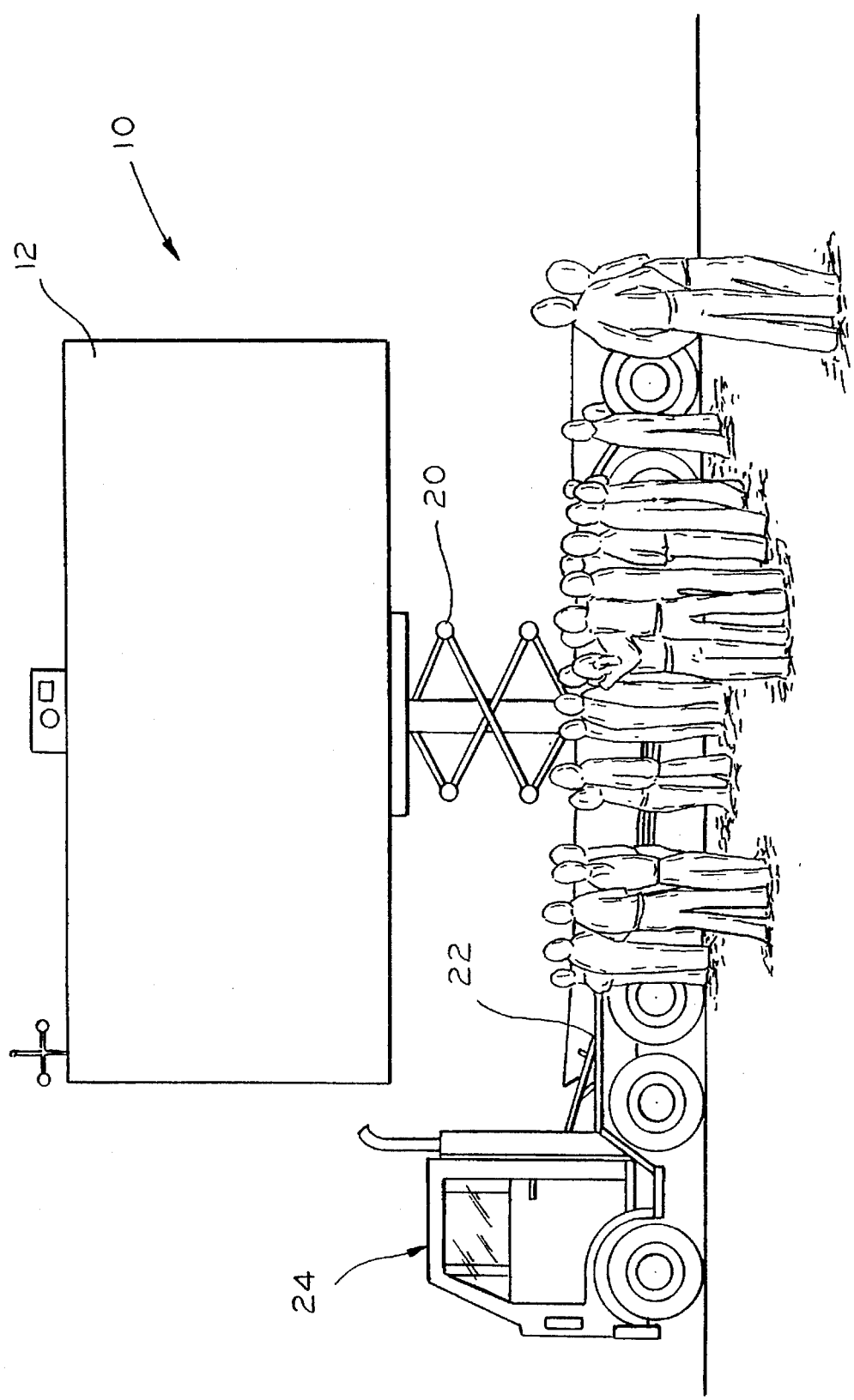

With reference to FIG. 2, the interactive video display system 10 is illustrated in another application. This application comprises mounting the display system 12 to a lifting device 20 mounted on the trailer 22 of a mobile vehicle 24. The lifting device 20 may be hydraulic, mechanical, a crane or the like. This provides for portability of the display system 10 as it can be moved to different locations either along a roadside or elsewhere, as necessary or desired. For example, the system 10 could be positioned in a shopping center parking lot with the billboard 12 raised, as shown. Alternatively, the billboard 12 could be lowered so that it was resting atop the trailer 22 while the vehicle was moving.

Figure 3:
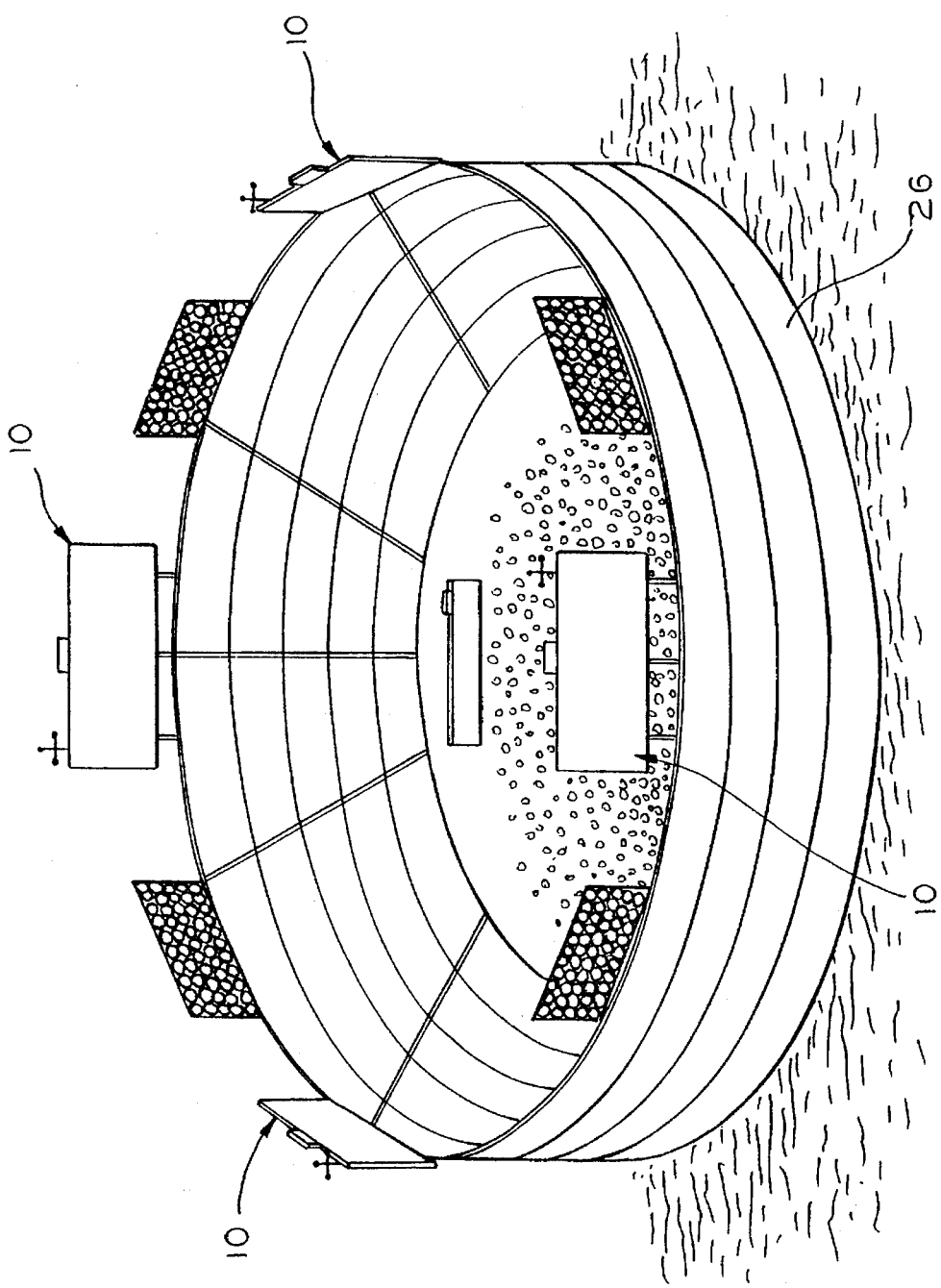

With reference to FIG. 3, a still further application is shown. This application comprises providing four display systems 10 circumferentially spaced about the top of a stadium 26. This is illustrated more particularly in FIG. 4, wherein it is apparent that each display system 10 can display uniquely different video information.

Figure 5:
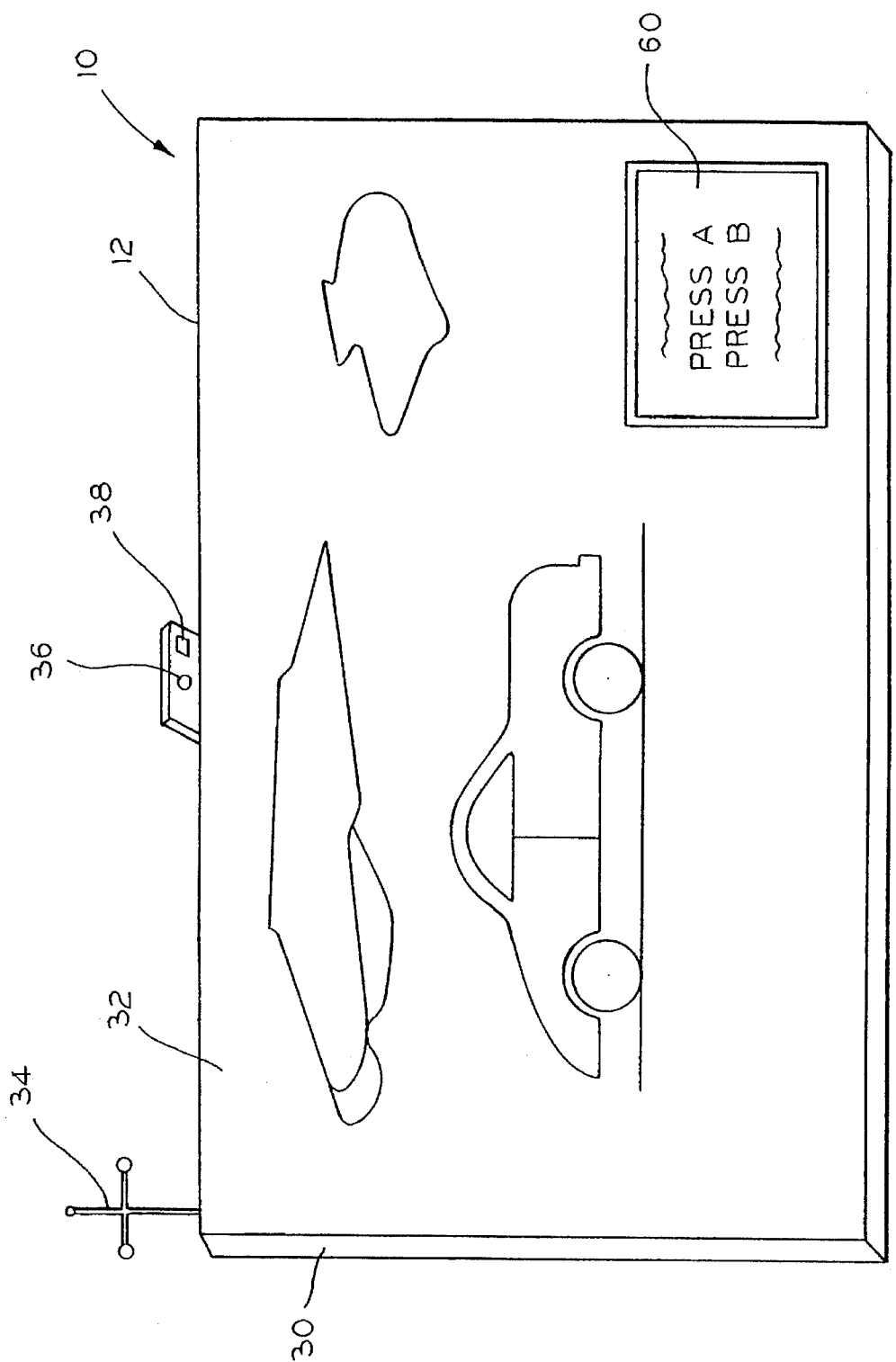
FIG. 5 comprises a perspective view of the interactive billboard system according to the invention.

With reference to FIG. 5, the interactive video display system 10 according to the invention is illustrated in greater detail.

The video display system 10 includes an enclosure 30 in the form of a parallelepiped having an internal space. A large screen video display monitor 32 is supported on the front of the enclosure 30. The display monitor 32 may comprise, for example, a JumboTron large screen color video display system as manufactured and sold by Sony Corporation of America (JumboTron is a trademark of Sony Corp.). The exact size of the display monitor 32 can be selected as necessary to suit the intended application. In the illustrated embodiments of the invention, the display monitor 32 is larger than a conventional table top television set.

In one aspect, the display system 10 is similar to a television set. It can display video information from received program signals from local or remote transmitters, satellites, cable and local or remote broadcast centers. The contents shown on the display monitor 32 can range from simple graphic images, for example, a corporate logo, to complex multi-media messages such as a conventional television commercial. For example, in the illustration of FIG. 5, the display monitor 32 displays, in part, an advertisement for an automobile. Additionally, the display system allows the viewer to "talk back" using various forms of communication.

Mounted atop the enclosure 30 is an antenna 34 used for receiving and transmitting various signals, as discussed below. Also, there is provided atop the enclosure 30 a video camera 36 as well as a speaker 38 for an appropriate sound system, as discussed below.

Figure 6:
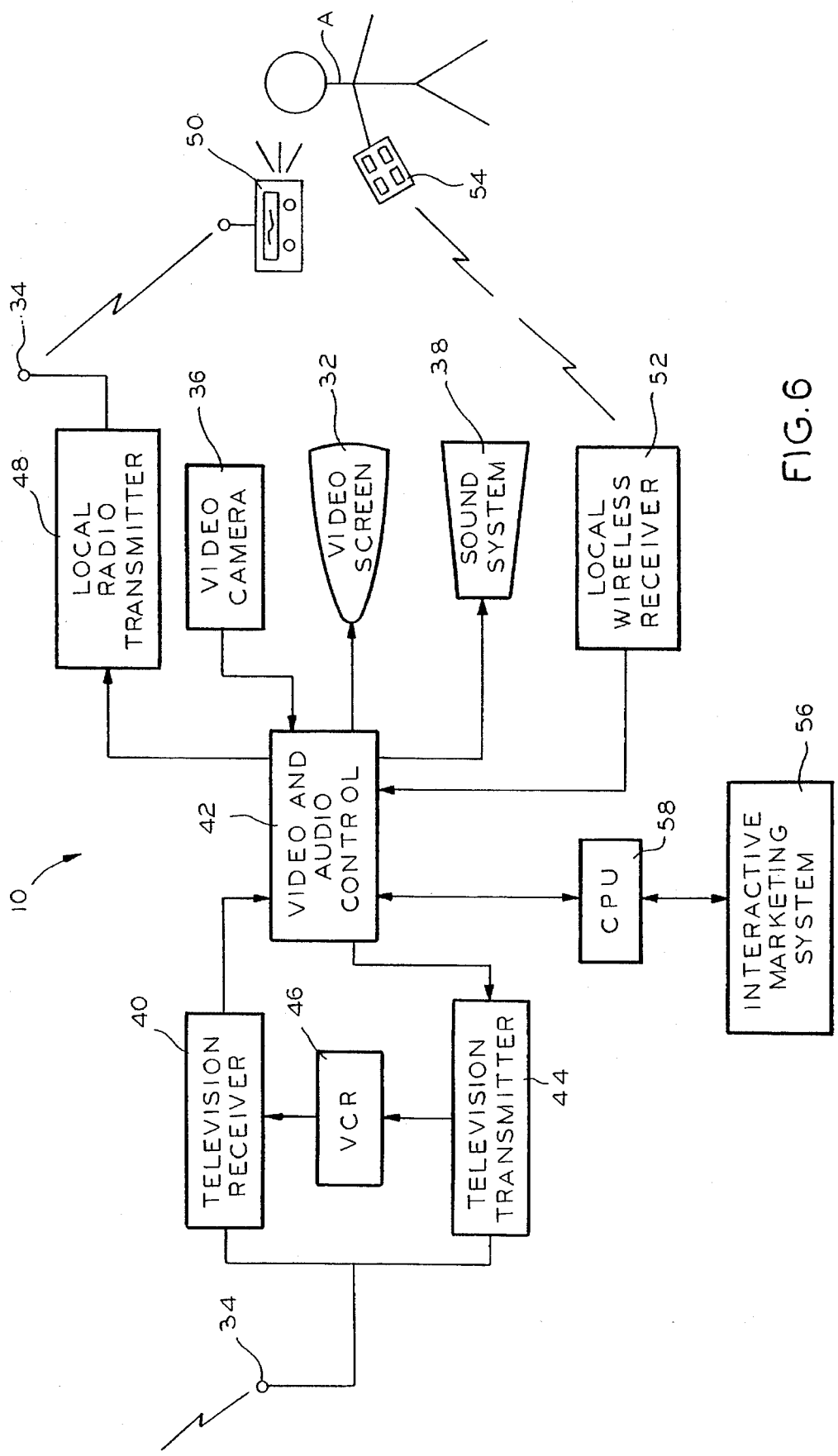
FIG. 6 is a block diagram illustrating the component parts of the interactive billboard system of FIG. 5.

FIG. 6 illustrates in block diagram form the interactive video display system 10 according to the invention. Other than the components previously mentioned above relative to FIG. 5, the remaining components are installed in the internal space of the enclosure 30.

A television receiver 40 is connected to the antenna 34 for receiving remotely broadcast modulated television signals.

As is well known, such a television signal conveys both video and audio information. The receiver 40 may comprise any conventional television receiving apparatus including tuner and the like for demodulating the received signal. The signal from the television receiver 40 is transferred to a video and audio control 42. A conventional television transmitter 44 is likewise connected between the video and audio control 42 and the antenna 34 for transmitting television signals to remote locations, as described below. A video cassette recorder (VCR) is connected to the television transmitter 44 for recording signals, as necessary, and to the television receiver 40 to provide for playback of previously recorded programming.

Although the receiver 40 and transmitter 44 are shown connected to an antenna 34, these devices could alternatively be connected to a microwave antenna or cable television system or satellite system, as will be apparent.

The video and audio control 42 also receives video information from the video camera 36. Particularly, the video camera 36 develops video signals representing images in an area surrounding the billboard system 10. The system 10 can include one or more cameras 36 so that the billboard is capable of "seeing" what is in front, on each side, or behind the display monitor 32. The camera 36 is shown as being mounted in a fixed position. Alternatively, the camera 36 could be mounted to a robotics device controlled by the video and audio control 42 for remote control operation of received images.

The video and audio control 42 also transfers video signals to the video screen 32 for driving the same, as well as audio signals to the sound system 38 for generating audio sounds in response thereto.

The video and audio control 42 is also connected to a local radio transmitter 48 also connected to the antenna 34. The video and audio control 42 transfers audio signals to the local radio transmitter 48. The transmitter 48 then transmits a radio frequency signal at a select frequency so that the audio information related to particular video information can be received by viewers proximate the system 10. Particularly, a viewer can set his or her radio 50 to the select frequency to receive the transmitted signals.

Further, the video and audio control 42 is connected to a receiver 52 for receiving commands from a user input device 54 operated by a viewer. In the illustrated embodiment, the receiver 52 receives through the air signals from a user input device in the form of a remote transmitter 54 held by a user. The user input device 54 could be a stationary device hardwired to the receiver 52, as is apparent. Particularly, the remote transmitter 54 can be used to provide feedback information to the interactive system 10. This is done in connection with an interactive marketing system 56 connected via a CPU 58 to the video and audio control 42. The CPU 58 may comprise any conventional personal computer or the like capable of generating conventional video signal transferred to the video and audio control 42 to be transferred to the video screen 32. Such video information may be driven by the interactive marketing system 56 which may comprise a conventional application program or the like run on the CPU 58. Further, responses received via the receiver 52 can be stored in the interactive marketing system 56 to provide feedback regarding programming or the like being presented.

With reference to FIG. 5, the video display monitor 32 is illustrated showing video information for a particular advertisement for an automobile. In the lower right hand corner there is shown a "window" or interactive dialogue box including additional video information. This information may be in the form of text or the like used, for example, as operating instructions to a viewer of the system, as well as instructions regarding entry of feedback on the user input device 54.

The described system has plural applications previously unavailable with conventional forms of advertising. Some of these applications are discussed with the following examples.

Considering the roadside billboard application as illustrated in FIG. 1, the display system 10 can be used to receive programming or advertising material, such as conventional commercials, by standard television broadcast, by satellite, through tapes in the VCR 46, see FIG. 6, or through computer storage on the CPU 58. The video information from such ad material is then sent directly to the video display 32 for display. The accompanying audio could be send directly to the sound system 38. However, doing so would serve no purpose with a typical roadside billboard. Instead, the audio signal is transmitted to the local radio transmitter so that it can be received on the car radio of the passersby. In order to instruct the passersby as to the appropriate frequency, the display window 60, see FIG. 5, can include appropriate instructions as to which station ought be tuned in. The instructions are generated by the CPU 58 and combined with the ad by the control 42, similar to a conventional "picture-in-picture" television feature, or by an overlaying procedure, as is well known. Thus, the effectiveness of the advertisement is increased due to the dynamic nature of the advertisement, the ability to continuously change the displayed advertisement as well as the ability to continually convey audio information to the user even after the video display monitor 32 is no longer visible. With appropriate spacing between adjacent billboard systems 20, a very effective advertising campaign can be planned in roadside applications.

Similarly, in an application such as in FIG. 2, a portable display system is evident in which the display system 10 could be placed in appropriate shopping center parking lots to advertise goods or services which might be available at the shopping center. In this application, the sound system 38 might be used as a pedestrian would often not have a radio readily available. Additionally, the radio transmitter 48 could be used to entice individuals passing by the shopping center. The portability allows the system 10 to be moved from one general location to the other or to particular locations in the local area, as appropriate.

Similar to the prior application, the interactive display system 10 could be temporarily placed in a parking lot for use after hours as a form of "drive up" theater. In this application, the sound could again be conveyed either via the sound system 38 or via the radio transmitter 48 to be heard on car radios.

Figure 4:
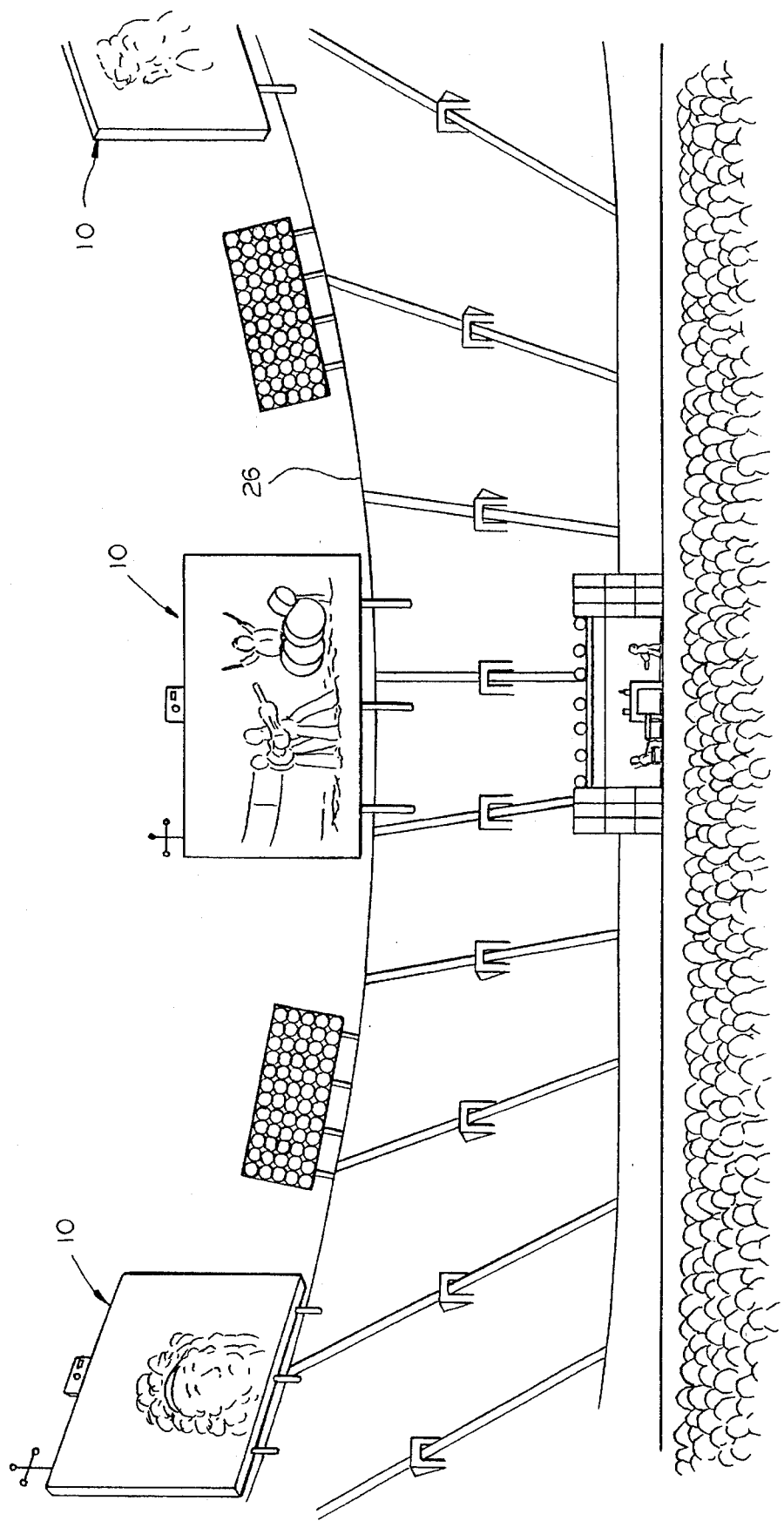

Referring to FIGS. 3 and 4, the display system 10 could be used as a large screen display for the activity occurring in the stadium 26. The image displayed could be that received from the camera 36 associated therewith. Alternatively, the display system 10 could display conventional commercial type messages. This application is particularly appropriate for use of the remote transmitters 54. For example, with special events such as the Super Bowl or the like, each customer could be given a remote transmitter 54 as they enter the stadium 26. During time outs from playing of the game, particular commercials could be displayed on the display system 10 followed by questions displayed in the window 60, see FIG. 6, regarding preferences or the like relating to the advertising material. For example, and with reference also to FIG. 5, a user could be instructed to press a particular button on the transmitter 54 according to the desired selection to be made. These instructions would be developed by the interactive marketing system 56, which would also store the results. This would allow the marketing system 56 to immediately survey those present to determine effectiveness of the advertising or consumer preferences.

Another application, not particularly illustrated, might comprise a marketing survey or special event in which interactive display systems are placed at remote locations relative to one another. Each display system could show a common overall display along with window type displays showing activities occurring at the remote locations. For example, one billboard system could be located at a beach, another in the mountains and another at an indoor reception. Each of the locations in addition to the main display would receive a window display showing activities at the other two locations as recorded by the video camera at the other locations.

As is evident, the use of the interactive video display system including the various output devices and feedback devices provides a myriad of applications for the system. The principle element of output is a video image on the large screen video display 32. This can be accompanied with audio output either through the sound system 38 or via radio transmission through the transmitter 48. Likewise, text type instructions could be generated by the CPU 58 for display on the screen 32. The source of any video signals can be through remote reception, tape storage or computer storage. The viewer can talk back to the display 32 in the form of video as received by the video camera 36 or transmitted responses via the user input device 54.

The illustrated applications of the interactive video display system are intended to broadly illustrate the basic inventive concept.

We claim:

1. An integrated video display system for communicating with local viewers comprising:

means for receiving a modulated signal carrying related audio and video information;

a video and audio control operatively connected to said receiving means for receiving the modulated signal and separating the signal into a video signal and an audio signal;

a video display monitor connected to said control for receiving the video signal and displaying the video information carried by said video signal;

a radio transmitter connected to said control for receiving the audio signal and transmitting a radio frequency signal at a select frequency so that the audio information related to the video information can be received by users proximate the video display monitor; and an interactive control operatively associated with said video and audio control for locally generating instructions to be displayed, the locally generated instructions being related to the audio and video information of the received modulated signal, said video and audio control combining the received instructions with the received video information prior to transferring the video signal to the video display monitor, the receiving means, video and audio control, video display monitor, radio transmitter and interactive control all being operatively associated together as an integral system.

2. The video display system of claim 1 wherein said receiving means comprises a television receiver.

3. The video display system of claim 1 wherein said receiving means comprises a video tape playing device.

4. The video display system of claim 1 further comprising an enclosure supporting said display monitor and housing said receiving means, said controls and said radio transmitter.

5. The video display system of claim 4 further comprising a stationary post supporting said enclosure at an elevated position.

6. An interactive video display system for communicating with local viewers comprising:

means for receiving a modulated signal carrying related audio and video information;

a video and audio control operatively connected to said receiving means for receiving the modulated signal and separating the signal into a video signal and an audio signal;

a video display monitor connected to said control for receiving the video signal and displaying the video information carried by said video signal;

a radio transmitter connected to said control for receiving the audio signal and transmitting a radio frequency signal at a select frequency so that the audio information related to the video information can be received by users proximate the video display monitor;

an interactive control operatively associated with said video and audio control for generating instructions to be displayed, said video and audio control combining the received instructions with the received video information prior to transferring the video signal to the video display monitor;

an enclosure supporting said display monitor and housing said receiving means, said controls and said radio transmitter; and a mobile vehicle and a lift supporting the enclosure on the vehicle.

7. The video display system of claim 1 further comprising an audio sound system operatively associated with said display monitor and connected to said video and audio control for receiving the audio signal and generating audio sounds in response thereto.

8. The video display system of claim 1 further comprising a receiver operatively associated with said interactive control for receiving user responses from a user input device proximate the system.

9. An interactive video display system for communicating with local viewers comprising:

means for receiving a modulated signal carrying related audio and video information;

a video and audio control operatively connected to said receiving means for receiving the modulated signal and separating the signal into a video signal and a audio signal;

a video display monitor connected to said control for receiving the video signal and displaying the video information carried by said video signal;

a radio transmitter connected to said control for receiving the audio signal and transmitting a radio frequency signal at a selected frequency so that the audio information related to the video information can be received by users proximate the video display monitor; and an interactive control operatively associated with said video and audio control for generating instructions to be displayed, said video and audio control combining the received instructions with the received video information prior to transferring the video signal to the video display monitor; and a receiver operatively associated with said interactive control for receiving user responses from a user input device proximate the system, wherein said interactive control comprises an interactive marketing system including means for generating a series of statements to be displayed on the display system and means for receiving and storing responses to said statements received from said receiver.

10. An interactive video display system for communicating with local viewers comprising:

means for receiving a modulated signal carrying related audio and video information;

a video and audio control operatively connected to said receiving means for receiving the modulated signal and separating the signal into a video signal and an audio signal;

a video display monitor connected to said control for receiving the video signal and displaying the video information carried by said video signal;

a radio transmitter connected to said control for receiving the audio signal and transmitting a radio frequency signal at a select frequency so that the audio information related to the video information can be received by users proximate the video display monitor;

an interactive control operatively associated with said video and audio control for generating instructions to be displayed, said video and audio control combining the received instructions with the received video information prior to transferring the video signal to the video display monitor; and a video camera mounted proximate said display system and connected to said video and audio control for developing a video camera signal representing images proximate said display system.

11. The video display system of claim 10 further comprising a television transmitter connected to said video and audio control for transmitting a signal including video information from said camera.

12. The video display system of claim 10 wherein said video and audio control includes means for displaying images from said video camera with received video information on said display monitor.

13. An interactive video display system for communicating with local viewers comprising:

an enclosure;

means in said enclosure for receiving a modulated signal carrying related audio and video information;

a video and audio control operatively connected to said receiving means for receiving the modulated signal and separating the signal into a video signal and an audio signal;

a video display monitor supported on said enclosure and connected to said control for receiving the video signal and displaying the video information carried by said video signal;

a radio transmitter in said enclosure connected to said control for receiving the audio signal and transmitting a radio frequency signal at a select frequency so that the audio information related to the video information can be received by users proximate the video display system; and an interactive control operatively associated with said video and audio control for generating instructions to be displayed, said video and audio control combining the received instructions with the received video information prior to transferring the video signal to the video display monitor.

14. The video display system of claim 13 wherein said receiving means comprises a television receiver.

15. The video display system of claim 13 wherein said receiving means comprises a video tape playing device.

16. The video display system of claim 13 further comprising a stationary post supporting said enclosure at an elevated position.

17. The video display system of claim 13 further comprising a mobile vehicle and a lift supporting the enclosure on the vehicle.

18. The video display system of claim 13 further comprising an audio sound system operatively associated with said display system and connected to said video and audio control for receiving the audio signal and generating audio sounds in response thereto.

19. The video display system of claim 13 further comprising a receiver operatively associated with said interactive control for receiving user responses from a user input device proximate the system.

20. The video display system of claim 19 wherein said interactive control comprises an interactive marketing system including means for generating a series of statements to be displayed on the display system and means for receiving and storing responses to said statements received from said receiver.

21. The video display system of claim 13 further comprising a video camera mounted proximate said display system and connected to said video and audio control for developing a video camera signal representing images proximate said display system.

22. The video display system of claim 21 further comprising a television transmitter connected to said video and audio control for transmitting a signal including video information from said camera.

23. The video display system of claim 11 wherein said video and audio control includes means for displaying images from said video camera with received video information on said display monitor.

* * * * *